(12) United States Patent
Perain et al.

(10) Patent No.: US 9,902,387 B2
(45) Date of Patent: Feb. 27, 2018

(54) MANAGEMENT OF THE DIFFERENTIAL PRESSURE THRESHOLDS OF A VACUUM PUMP CONNECTED TO THE BRAKING SYSTEM OF A MOTOR VEHICLE

(71) Applicant: RENAULT s.a.s., Boulogne-Billancourt (FR)

(72) Inventors: Frederic Perain, Massy (FR); Pierre Garnier, Gambais (FR); Sophie Constant, Le Plessis Robinson (FR); Borhen Felah, Montigny le Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 15/031,129

(22) PCT Filed: Oct. 7, 2014

(86) PCT No.: PCT/FR2014/052535
§ 371 (c)(1),
(2) Date: Apr. 21, 2016

(87) PCT Pub. No.: WO2015/059383
PCT Pub. Date: Apr. 30, 2015

(65) Prior Publication Data
US 2016/0264119 A1    Sep. 15, 2016

(30) Foreign Application Priority Data
Oct. 23, 2013   (FR) .................................... 13 60332

(51) Int. Cl.
*B60T 17/02* (2006.01)
*F04B 35/00* (2006.01)
(Continued)

(52) U.S. Cl.
CPC .............. *B60T 17/02* (2013.01); *B60T 13/52* (2013.01); *B60T 13/662* (2013.01); *B60T 13/72* (2013.01);
(Continued)

(58) Field of Classification Search
None
See application file for complete search history.

(56) References Cited

U.S. PATENT DOCUMENTS 4,738,112 A * 4/1988 Nomura .................. B60T 17/02
303/12
5,515,676 A * 5/1996 Earle ...................... B60T 13/46
417/12
(Continued)

FOREIGN PATENT DOCUMENTS

| EP | 1 681 219 A2 | 7/2006 |
| FR | 2 877 629 A1 | 5/2006 |
| GB | 2 492 404 A | 1/2013 |

OTHER PUBLICATIONS

International Search Report dated Apr. 22, 2015, in PCT/FR2014/052535 Filed Oct. 7, 2014.
(Continued)

*Primary Examiner* — Redhwan K Mawari
*Assistant Examiner* — Edward Torchinsky
(74) *Attorney, Agent, or Firm* — Oblon, McClelland, Maier & Neustadt, L.L.P.

(57) ABSTRACT

A method and system for management of a vacuum pump connected to a braking system of a motor vehicle, and use of an electronic control unit connected to the vacuum pump. At least one differential pressure threshold associated with the vacuum pump, selected from a first differential pressure threshold controlling stopping of operation of the vacuum pump, a second differential pressure threshold controlling starting of the vacuum pump, and a third differential pres-
(Continued)

sure threshold, lower than the second threshold and signalling alerts representative of operating faults, is determined by taking into account a first set of data representative of the detection or otherwise of a repetitive braking situation and/or a second set of data representative of altitude of the vehicle.

15 Claims, 4 Drawing Sheets

(51) Int. Cl.
  *B60T 13/66*    (2006.01)
  *B60T 13/72*    (2006.01)
  *B60T 13/52*    (2006.01)
  *B60W 10/30*    (2006.01)
  *F04B 49/02*    (2006.01)

(52) U.S. Cl.
  CPC ........... *B60W 10/30* (2013.01); *F04B 35/002* (2013.01); *F04B 49/02* (2013.01); *F04B 2207/02* (2013.01)

(56) References Cited

U.S. PATENT DOCUMENTS

| | | | |
|---|---|---|---|
| 6,735,942 B2* | 5/2004 | Wild | B60T 17/02 60/397 |
| 8,678,773 B2* | 3/2014 | Schmid | B60T 17/02 417/14 |
| 9,103,246 B2* | 8/2015 | Pursifull | F01M 1/02 |
| 2005/0178622 A1* | 8/2005 | Blue | B60T 8/1708 188/71.1 |
| 2006/0158028 A1* | 7/2006 | Ichikawa | B60K 6/543 303/114.3 |
| 2015/0037172 A1* | 2/2015 | Liddington | B60T 13/52 417/53 |

OTHER PUBLICATIONS

French Search Report dated Jul. 31, 2014, in FR 1360332 Filed Oct. 21, 2013.

* cited by examiner

MANAGEMENT OF THE DIFFERENTIAL PRESSURE THRESHOLDS OF A VACUUM PUMP CONNECTED TO THE BRAKING SYSTEM OF A MOTOR VEHICLE

TECHNICAL FIELD OF THE INVENTION

The invention concerns a method for managing a vacuum pump connected to a braking system of a motor vehicle, comprising a step of using an electronic control unit linked to the vacuum pump.

The object of the invention is also a system for managing the vacuum pump, comprising an electronic control unit including hardware and/or software elements implementing the management method.

PRIOR ART

Motor vehicle braking systems comprise firstly a hydraulic system acting on the braking elements of the vehicle when the driver actuates a brake pedal, and secondly an assistance and amplification device which allows amplification between the forces applied to the brake pedal and the forces acting on the braking elements.

Document DE 100087975A1 describes a solution allowing amplification of the braking pressure generated by pressure on the brake pedal, which uses a known technology of using an aeraulic vacuum usually generated by the reduced pressure at the intake of the internal combustion engine of the vehicle, as is the case for example in document EP1071873A1.

If the vacuum obtained from the internal combustion engine of the vehicle is insufficient or absent (which is likely to be the case for example in a vehicle with purely electric or hybrid traction), the assistance and amplification device generally uses a vacuum pump, for example of the type of the solution described in document FR2877629A1. In other words, the assistance and amplification device may conventionally comprise a vacuum source including a vacuum pump connected to the braking system.

Because of a need for optimum efficiency of braking systems, the use of a vacuum pump connected to the braking system introduces a general problem linked to this vacuum pump, which lies in the choice of the upper differential pressure threshold commanding the stoppage of operation of the vacuum pump, the choice of the lower differential pressure threshold commanding the start of operation of the vacuum pump, and in some cases also the choice of the differential pressure threshold signaling alerts representative of operating defects. The functioning of the braking system depends directly on the choice of these differential pressure thresholds: a compromise must be found between firstly the need for a sufficient and certain differential pressure to ensure the assistance and amplification function reliably and suitably, and secondly the need to avoid untimely actuation of the vacuum pump, which is a source of overconsumption and entails risks of premature deterioration of the vacuum pump.

At present, for example in the manner described in document FR2877629A1 mentioned above, the threshold for starting the vacuum pump is fixed and calibrated for altitude corresponding to sea level.

It has already been considered to adapt the thresholds for activation and deactivation of the vacuum pump as a function of the vehicle's speed. Although this approach improves the above-mentioned situations, under certain particular situations not taken into account when determining the thresholds, these thresholds become unsuitable for said conditions and lead to a loss of efficacy of braking and/or the issuing of unwarranted failure alerts.

There is a need to optimize the determination of the operating thresholds of the vacuum pump in a manner which simultaneously meets the need for a sufficient and certain differential pressure to ensure the assistance and amplification function reliably and suitably, and the need for avoiding untimely operation of the vacuum pump, independently of the situations encountered by the vehicle.

OBJECT OF THE INVENTION

The object of the present invention is to propose a solution for managing a vacuum pump connected to a braking system of a motor vehicle which remedies the drawbacks listed above.

This object may be achieved with a method for managing a vacuum pump connected to a braking system of a motor vehicle, comprising a step of using an electronic control unit linked to the vacuum pump, and a step of determining at least one differential pressure threshold associated with the vacuum pump and selected from a first differential pressure threshold commanding the stoppage of operation of the vacuum pump, a second differential threshold commanding the starting of the vacuum pump, and a third differential pressure threshold lower than the second threshold and signaling alerts representative of operating defects, while taking into account a first data set representative of detection or non-detection of a repetitive braking situation, and/or a second data set representative of the altitude of the vehicle.

The management method may comprise a step of modifying at least the first and second differential pressure thresholds, perhaps also the third differential pressure threshold, such that at a given altitude, at least the first and second differential pressure thresholds and perhaps also the third differential pressure threshold develop by incremental stages when the vehicle's travel speed increases, the transition between two successive stages occurring at predefined speed thresholds stored in an electronic control unit.

In one embodiment, this modification step is inhibited when the first data set is representative of detection of the presence of a repetitive braking situation, such that at least the first and second differential pressure thresholds, perhaps also the third differential pressure threshold, are held constant by the electronic control unit irrespective of the vehicle's travel speed.

Preferably, this modification step is also modulated as a function of the second data set. Thus at a given travel speed of the vehicle, at least the first and second differential pressure thresholds, perhaps also the third differential pressure threshold, develop incrementally as a function of the altitude of the vehicle.

At a given travel speed of the vehicle, at least the first and second differential pressure thresholds, perhaps also the third differential pressure threshold, may develop by incremental stages as the vehicle's altitude increases, the transition between two successive stages occurring at predefined altitude thresholds stored in the electronic control unit.

According to one embodiment, at each altitude threshold, a hysteresis is implemented such that:
the transition from one stage to the immediately lower stage as the altitude decreases is applied at the moment when the vehicle's altitude is lower than said altitude threshold and when the difference between said altitude threshold and the vehicle's altitude becomes greater than a first predefined value, the transition from one stage to the immediately higher stage as the altitude increases is applied at the moment when the vehicle's altitude is higher than said altitude threshold and when the difference between the vehicle's altitude and said altitude threshold becomes greater than a second predefined value, which may be equal to said first predefined value.

A system for managing a vacuum pump connected to a braking system of a vehicle may comprise an electronic control unit including hardware and/or software elements implementing this management method.

In particular, the system may comprise an element for detecting the presence or absence of a repetitive braking situation and supplying the electronic control unit with the first data set, and/or an element for assessing the altitude of the vehicle and supplying the electronic control unit with the second data set.

A motor vehicle may comprise such a management system, a vacuum pump associated with a vacuum reserve and managed by the management system, the electronic control unit being linked to the vacuum pump so as to start the operation of the vacuum pump when the difference between the ambient pressure of the vehicle and the pressure of the vacuum reserve is less than or equal to the second differential pressure threshold determined by the electronic control unit, and to stop the operation of the vacuum pump when the difference between the ambient pressure of the vehicle and the pressure of the pressure reserve is greater than or equal to the first differential pressure threshold determined by the electronic control unit.

BRIEF DESCRIPTION OF THE DRAWINGS

Further advantages and characteristics will appear more clearly from the description below of particular embodiments of the invention, given as non-limitative examples and shown on the attached drawings, in which.

DESCRIPTION OF PREFERRED EMBODIMENTS OF THE INVENTION

With reference to FIGS. 1 to 6, the invention concerns a method for managing a vacuum pump connected to a braking system of a motor vehicle, the method comprising a step of using an electronic control unit linked to the vacuum pump and controlling the vacuum pump. It also concerns a system of managing the vacuum pump, comprising this electronic control unit which is equipped with hardware and/or software elements implementing the management method.

In general, the method comprises a step of determining at least one differential pressure threshold associated with the vacuum pump and taking into account a first data set representative of the detection or non-detection of a repetitive braking situation, and/or a second data set representative of the altitude of the vehicle. Said at least one differential pressure threshold is selected from:
  a first differential pressure threshold commanding the stoppage of operation of the vacuum pump; this is an upper threshold,
  a second differential pressure threshold commanding the start of the vacuum pump and lower than the first threshold; this is a lower threshold,
  and a third differential pressure threshold lower than the second threshold and signaling alerts representative of operating defects.

In other words, when the differential pressure is higher than the first differential pressure threshold, the electronic control unit commands the stoppage of operation of the vacuum pump. When the differential pressure is lower than the second differential pressure threshold, the electronic control unit commands the start of the vacuum pump. When the differential pressure is lower than the third differential pressure threshold, the electronic control unit commands the stoppage of operation of the vacuum pump and signals alerts representative of operating defects of the vacuum pump and/or the braking system.

Figure 7:
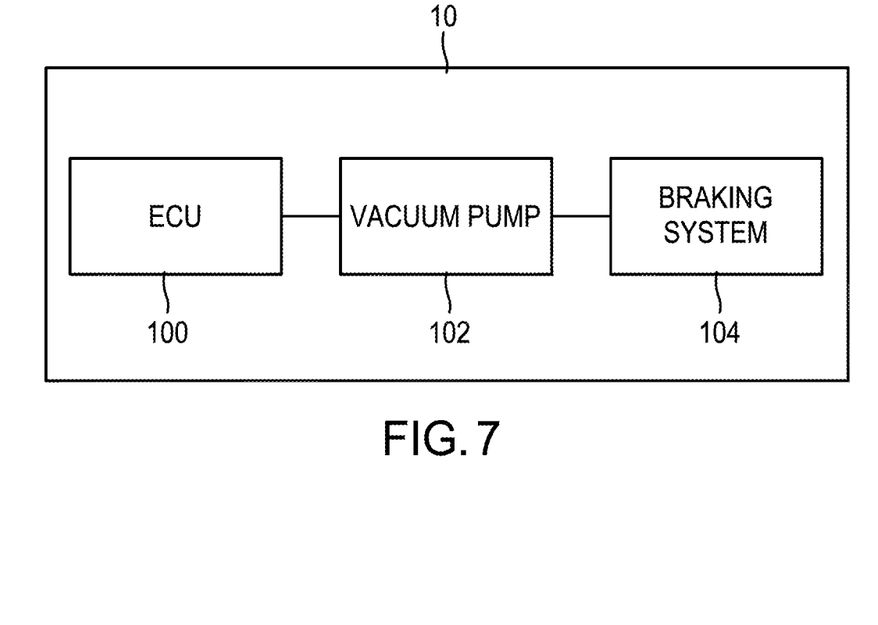
FIG. 7 is a diagram of a motor vehicle including an electronic control unit, vacuum pump, and braking system described herein.

As shown in FIG. 7, motor vehicle 10 thus comprises an electronic control unit 100 as such a management system, a vacuum pump 102 associated with a vacuum reserve and managed by the management system, and a braking system 104. The electronic control unit is linked to the vacuum pump and controls it so as to start the vacuum pump when the difference between the ambient pressure of the vehicle and the pressure of the vacuum reserve is less than or equal to the second differential pressure threshold determined by the electronic control unit, and to stop the operation of the vacuum pump when the difference between the ambient pressure of the vehicle and the pressure of the pressure reserve is greater than or equal to the first differential pressure threshold determined by the electronic control unit.

The management system may in particular comprise an element for detecting the presence or absence of a repetitive braking situation, supplying the electronic control unit with the first data set, and/or an element for assessing the altitude of the vehicle and supplying the electronic control unit with the second data set. Examples of such elements are described below.

In this way, the first and second differential pressure thresholds, or also the third differential pressure threshold, associated with the function of the vacuum pump are advantageously adapted:

as a function of the altitude of the vehicle,
and/or to the moment when the repetitive braking situation is encountered.

The term "repetitive braking situation" should be understood in the present document as a situation detected when a number of presses on the brake pedal by the driver, in particular with a pressure force greater than a given force threshold, in a given temporal sliding window, is greater than a predefined number.

It is known that atmospheric pressure diminishes as altitude increases, the pressure differential reducing as a consequence.

In the prior art, alerts to the driver are issued whenever the altitude is such that the actual differential pressure becomes lower than the third differential pressure threshold, and the efficacy of the braking also diminishes because the first and second differential pressure thresholds are fixed. Thanks to the management strategy described here, it is possible to avoid the issuing of these alerts to the driver resulting from a simple increase in altitude, and the threshold for starting the vacuum pump, i.e. in particular the second differential pressure threshold, is raised in order to retain a sufficient pressure difference between the pressure of the chamber at vacuum and the pressure of the chamber at ambient atmospheric pressure.

Secondly, with a strategy according to the prior art, the vacuum level for the braking assistance is liable to be insufficient during a repetitive braking situation, also known as a "repetitive brake test" procedure. To remedy this, the management strategy described here highly advantageously provides the possibility of linking the recognition of the "repetitive brake test" procedure with the strategy for starting the vacuum pump.

The "repetitive brake test" procedure is a standard procedure for characterizing the thermal endurance of the braking system of a vehicle. It consists of performing sequences of applied brakings under well-defined conditions (speed at start of braking, speed at end of braking, deceleration, interval between brakings etc.). There are several criteria for evaluating this characterization of the vehicle, including the pedal travel/pedal force necessary to achieve the deceleration required by the procedure and the stopping distance. The present strategy of managing the activation and deactivation thresholds for the vacuum pump allows detection of these severe braking situations and generation of a sufficient vacuum level to achieve better performance during this test. The principle of the strategy of detecting the situations described above consists of detecting a sequence of brakings (interval between activations of the brake pedal switch, hydraulic pressure level achieved for each brake application etc.

Figure 1:
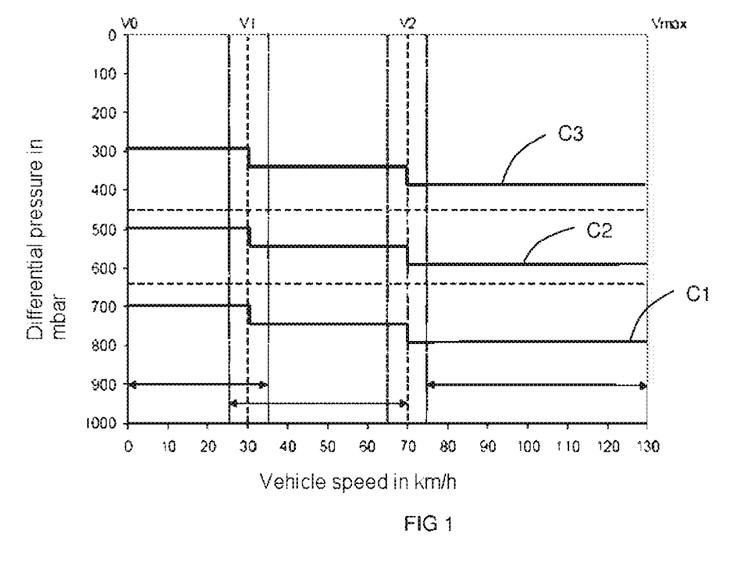
FIG. 1 illustrates curves C1 to C3 showing the development of the three differential pressure thresholds (expressed in mbar) linked to the vacuum pump as a function of the vehicle's speed (expressed in km/h), at a first altitude and in the absence of detection of a repetitive braking situation.

The method comprises a step of modifying at least the first and second differential pressure thresholds, perhaps also the third differential pressure threshold, as a function of the travel speed of the vehicle. FIG. 1 illustrates curves C1 to C3 which represent the development respectively of the first, second and third differential pressure thresholds linked to the vacuum pump as a function of the vehicle's speed, at a first altitude of the vehicle and in the absence of detection of a repetitive braking situation. The vehicle's speed develops between a minimum speed V0 (for example 0 km/h) and a maximum speed Vmax (for example 200 km/h). The first altitude is for example substantially equal to 1500 meters.

As illustrated on FIG. 1, at a given altitude such as for example said first altitude, at least the first and second differential pressure thresholds, perhaps also the third differential pressure threshold, each develop by constant incremental stages when the vehicle's speed increases. The transition between two successive stages occurs at predefined speed thresholds stored in the electronic control unit.

FIG. 1 illustrates the particular case implementing two such predefined speed thresholds, marked V1 and V2. Each of the first, second and third differential pressure thresholds develops in three incremental stages, delimited two by two by the speed thresholds V2, V2. This is depicted by each of the curves C1, C2, and C3. Since the first differential pressure threshold is higher than the second differential pressure threshold, which in turn is higher than the third differential pressure threshold, curve C1 shows values higher than those of curve C2, which in turn shows values higher than those of curve C3.

It is still possible to consider any other relationship between the differential pressure thresholds and the vehicle speed, for example a different number of stages and a different number of speed thresholds. It is also possible to provide that the speed thresholds associated with a given differential pressure threshold are different from the speed thresholds associated with another differential pressure threshold.

Figure 2:
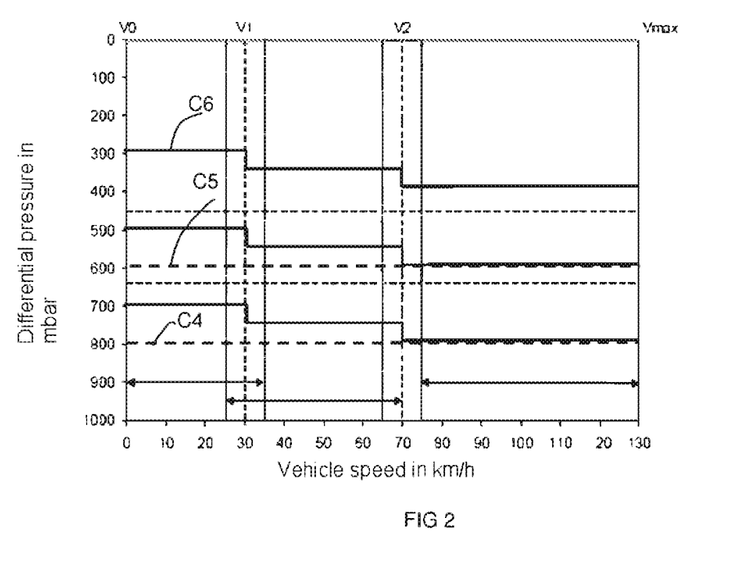
FIG. 2 illustrates curves C4 to C6 showing the development of the three differential pressure thresholds (expressed in mbar) as a function of the vehicle's speed (expressed in km/h), at the first altitude, in the presence of detection of a repetitive braking situation.

FIG. 2 then shows the fact that the determination of at least one differential pressure threshold associated with the vacuum pump, selected from the first differential pressure threshold, the second differential pressure threshold and the third differential pressure threshold, takes into account the first data set representative of the detection or non detection of a repetitive braking situation.

FIG. 2 thus illustrates curves C4 to C6 which represent the respective development of the first, second and third differential pressure thresholds as a function of the vehicle's speed, at the first altitude shown in FIG. 1 but in the case of detection of the presence of a repetitive braking situation, in contrast to FIG. 1. In the particular embodiment, only the first and second differential pressure thresholds are modified between FIG. 1 and FIG. 2, such that curve C6 of FIG. 2 is identical to curve C3 of FIG. 1. However the third differential pressure threshold could also be modified.

With reference to FIG. 2, the step of modification of the differential pressure thresholds as a function of the vehicle speed described in relation to FIG. 1 is inhibited when the first data set is representative of detection of the presence of a repetitive braking situation, such that at least the first and second differential pressure thresholds, perhaps also the third differential pressure threshold, are held constant by the electronic control unit irrespective of the travel speed of the vehicle. This is why on FIG. 2, curves C4 and C5 are constant, horizontal straight lines.

The principle of this strategy, a function of detection or non-detection of a repetitive braking situation, combined with the strategy of modulation as a function of speed, therefore provides for adaptation of the activation and deactivation thresholds of the vacuum pump in the case of repetitive braking. Thus the braking system performance is improved.

The strategy of detection of a repetitive braking situation is conventionally available in the vehicle electronic stability control system. This information may be provided for the electronic control unit for use the strategy of adapting the differential pressure thresholds of the vacuum pump, or it may be reconstructed from information available such as monitoring of the brake pedal switch, the braking pressure, the vehicle's speed.

Once the repetitive braking situation is detected, it is possible to adapt the differential pressure thresholds, for example the thresholds for activation and deactivation of the vacuum pump, to achieve better performance of the braking system as illustrated on FIG. 2.

To summarize, the electronic control unit adopts the first differential pressure threshold according to curve C1, the second differential pressure threshold according to curve C2, and the third differential pressure threshold according to curve C3, as long as a repetitive braking situation is not detected. However, when a repetitive braking situation is detected, the electronic control unit adopts the first constant differential pressure threshold as a function of speed according to curve C4, the second constant differential pressure threshold as a function of speed according to curve C5, and the third differential pressure threshold according to curve C6 which is for example identical to curve C3.

Separately or in combination with the strategy of determining the differential pressure thresholds taking into account the first data set described above, the step of modifying the differential pressure thresholds as a function of the vehicle's speed is modulated as a function of the second data set.

FIGS. 3 to 6 thus illustrate that the determination of at least one differential pressure threshold associated with the vacuum pump and selected from the first differential pressure threshold, the second differential pressure threshold and the third differential pressure threshold, takes into account the second data set representative of the vehicle's altitude.

In addition or by substitution, this strategy therefore provides for adaptation of the differential pressure thresholds, for example the thresholds for activation and deactivation of the vacuum pump, as a function of the altitude of the vehicle. Given that the atmospheric pressure varies as a function of altitude, the vacuum level generated by the vacuum pump may be adapted as a consequence while maintaining the same braking system performance. Thus the vacuum pump is used:

for a shorter time at low altitude than in the prior art, leading to a gain in service life and electrical power consumption, or for a longer time at higher altitude levels than in the prior art, in order to improve the performance of the braking system.

The information concerning the vehicle's altitude may be provided by a positioning device such as a GPS (Global Positioning System) via the vehicle's multimedia network. Given that this information is sometimes not reliable, due example discontinuity in reception, this information is preferably used only for convenience. The system is configured so as to ensure safe performance in the absence of this information.

Figure 3:
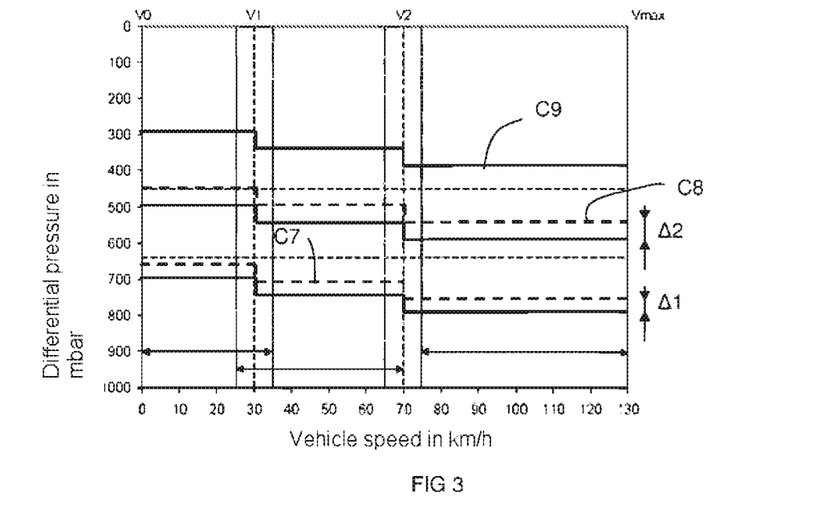
FIG. 3 illustrates curves C7 to C9 showing the development of the three differential pressure thresholds (expressed in mbar) as a function of the vehicle's speed (expressed in km/h), at a second altitude lower than the first altitude and in the absence of detection of a repetitive braking situation.

FIG. 3 illustrates curves C7 to C9 which represent the development respectively of the first, second and third differential pressure thresholds as a function of the vehicle's speed, at a second altitude lower than the first altitude and in the absence of detection of a repetitive braking situation. In the particular embodiment, only the first and second differential pressure thresholds are modified between FIG. 1 and FIG. 3, such that curve C9 of FIG. 3 is identical to curve C3 of FIG. 1. However the third differential pressure threshold could also be modified.

Thus with reference to FIG. 3, at least the first and second differential pressure thresholds are adapted as a function of the second altitude, corresponding for example substantially to sea level: in relation to FIG. 1, these two differential pressure thresholds undergo a predefined reduction $\Delta 1$, $\Delta 2$ as a function of altitude. The first differential pressure threshold according to curve C7 of FIG. 3, produced for the second altitude, is diminished by a reduction $\Delta 1$ in relation to the first pressure threshold according to curve C1 of FIG. 1, produced for the first altitude. The second differential pressure threshold according to curve C8 of FIG. 3, produced for the second altitude, is diminished by reduction $\Delta 2$ in relation to the second pressure threshold according to curve C2 of FIG. 1, produced for the first altitude. The value of the reduction $\Delta 1$ may be equal or not equal to the value of the reduction $\Delta 2$.

Figure 4:
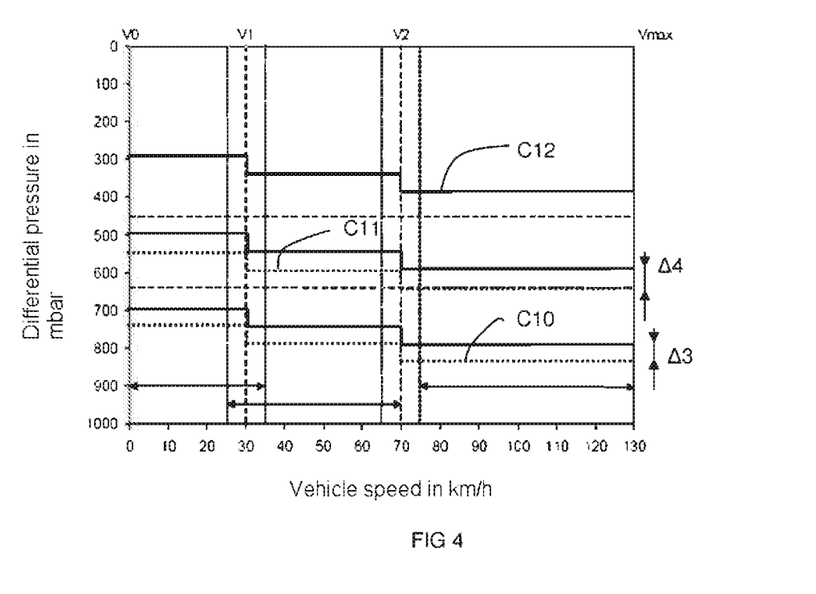
FIG. 4 illustrates curves C10 to C12 showing the development of the three differential pressure thresholds (expressed in mbar) as a function of the vehicle's speed (expressed in km/h), at a third altitude higher than the first altitude and in the absence of detection of a repetitive braking situation.

FIG. 4 illustrates curves C10 to C12 which represent the development respectively of the first, second and third differential pressure thresholds as a function of the vehicle's speed, at a third altitude higher than the first altitude and in the absence of detection of a repetitive braking situation. In the particular embodiment, only the first and second differential pressure thresholds are modified between FIG. 1 and FIG. 4, such that curve C12 of FIG. 4 is identical to curve C3 of FIG. 1. However the third differential pressure threshold could also be modified.

Thus with reference to FIG. 4, at least the first and second differential pressure thresholds are adapted as a function of the third altitude, corresponding for example to an altitude of substantially 2500 meters: in relation to FIG. 1, these two differential pressure thresholds undergo a predefined increase $\Delta 3$, $\Delta 4$ as a function of altitude. The first differential pressure threshold according to curve C10 of FIG. 4, produced for the third altitude, is incremented by increase $\Delta 3$ in relation to the first pressure threshold according to curve C1 of FIG. 1, produced for the first altitude. The second differential pressure threshold according to curve C11 of FIG. 4, produced for the third altitude, is incremented by an increase $\Delta 4$ in relation to the second pressure threshold according to curve C2 of FIG. 1, produced for the first altitude. The value of the decrease $\Delta 3$ may be equal or not equal to the value of the decrease $\Delta 4$.

To summarize, the electronic control unit preferably adopts the first differential pressure threshold according to curve C1, the second differential pressure threshold according to curve C2, and the third differential pressure threshold according to curve C3, as long as the altitude is higher than a first altitude threshold S1 between said first altitude and said second altitude, and lower than a second altitude threshold S2 between said first altitude and said third altitude. However when the actual altitude is lower than the first altitude threshold S1, the electronic control unit adopts the first differential pressure threshold as a function of the speed according to curve C7, the second differential pressure threshold as a function of the speed according to curve C8, and the third differential pressure threshold according to curve C9 which may for example be identical to curve C3. When the actual altitude is higher than the second altitude threshold S2, the electronic control unit adopts the first differential pressure threshold as a function of the speed according to curve C10, the second differential pressure threshold as a function of the speed according to curve C11, and the third differential pressure threshold according to curve C12 which may for example be identical to curve C3.

The information concerning the altitude of the vehicle is acquired preferably using the multimedia system which uses or has access to this information.

Figure 5:
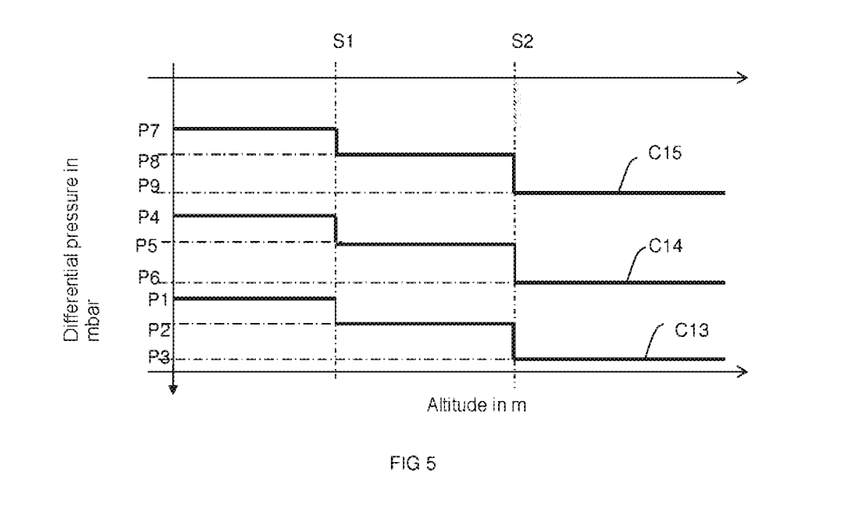
FIG. 5 illustrates curves C13 to C15 showing the development of the three differential pressure thresholds (expressed in mbar) linked to the vacuum pump as a function of the vehicle's altitude (expressed in m), at a given speed of the vehicle.

In a first approach, it is possible to provide that the total altitude range within which the vehicle is liable to move (such a range may be defined as varying between a minimum altitude of 0 meter relative to sea level, and a maximum altitude of 4000 meters above sea level) is divided into a plurality of successive sections delimited by altitude thresholds. The number of sections and the number of altitude thresholds may vary depending on the desired precision. The particular and non-limitative example illustrated in relation to FIG. 5 provides that the total range of 0-4000 m is divided into three sections via the two thresholds S1 and S2 at 1000 m and 2000 m respectively. Thus the total range between 0 and 4000 m is divided into a first section between 0 and 1000 m, a second section between 1000 and 2000 m, and a third section between 2000 and 4000 m.

In general, at a given travel speed of the vehicle, at least the first and second differential pressure thresholds, perhaps also the third differential pressure threshold, develop incrementally as a function of the vehicle's altitude. According to an embodiment as shown in FIG. 5, at a given travel speed of the vehicle, at least the first and second differential pressure thresholds, perhaps also the third differential pressure threshold, develop by constant incremental stages when the altitude (represented on the abscissa) of the vehicle increases, the transition between two successive stages occurring at predefined altitude thresholds S1, S2 recorded in the electronic control unit.

FIG. 5 illustrates curves C13 to C15 representing the development of the three differential pressure thresholds linked to the vacuum pump as a function of the vehicle's altitude, at a given speed of the vehicle. More precisely, curve C13 represents the development of the first differential pressure threshold at a given vehicle speed, as a function of the vehicle's altitude. Curve C14 represents the development of the second differential pressure threshold at the same given speed of the vehicle, as a function of the vehicle's altitude. Curve C15 finally represents the development of the third differential pressure threshold at the same given speed of the vehicle, as a function of the vehicle's altitude.

According to the embodiment shown in FIG. 5, at the given travel speed of the vehicle, the first differential pressure threshold develops by incremental stages P1, P2, P3 when the vehicle's altitude increases. The first stage P1 is applied for the first section which varies between 0 and 1000 m. The second stage P2 is applied for the second section which varies between 1000 and 2000 m. The third stage P3 is applied for the third section which varies between 2000 and 4000 m. The transition between successive stages P1, P2 takes place at the altitude threshold S1. The transition between successive stages P2, P3 takes place at the altitude threshold S2.

According to the embodiment shown in FIG. 5, at the given travel speed of the vehicle, the second differential pressure threshold develops by incremental stages P4, P5, P6 when the vehicle's altitude increases. The first stage P4 is applied for the first section which varies between 0 and 1000 m. The second stage P5 is applied for the second section which varies between 1000 and 2000 m. The third stage P6 is applied for the third section which varies between 2000 and 4000 m. The transition between successive stages P4, P5 takes place at the altitude threshold S1. The transition between successive stages P5, P6 takes place at the altitude threshold S2.

According to the embodiment shown in FIG. 5, at the given travel speed of the vehicle, the third differential pressure threshold develops by incremental stages P7, P8, P9 when the vehicle's altitude increases. The first stage P7 is applied for the first section which varies between 0 and 1000 m. The second stage P8 is applied for the second section which varies between 1000 and 2000 m. The third stage P9 is applied for the third section which varies between 2000 and 4000 m. The transition between successive stages P7, P8 takes place at the altitude threshold S1. The transition between successive stages P8, P9 takes place at the altitude threshold S2.

Although on FIG. 5 the three differential pressure thresholds vary with altitude as illustrated by curves C13 to C15 in the form of steps at successive stages, it may be provided that only one or two of these three differential pressure thresholds shows such a variation as a function of the vehicle's altitude. Also, the altitude thresholds associated with a differential pressure threshold may vary from one differential pressure threshold to the next.

The altitude threshold values are preferably variable data which may be adapted as a function of the vehicle type and/or sales market.

In general, at each altitude threshold, a hysteresis principle may advantageously be applied by the electronic control unit such that:

the transition from one stage to the directly lower stage as the altitude decreases is applied at the moment when the vehicle's altitude is lower than said altitude threshold and when the difference between said altitude threshold and the vehicle's altitude becomes greater than a first predefined value, the transition from one stage to the directly higher stage as the altitude increases is applied at the moment as the vehicle's altitude is higher than said altitude threshold and when the difference between the vehicle's altitude and said altitude threshold becomes greater than a second predefined value, which may be equal to said first predefined value.

The advantage of this characteristic is to avoid discontinuities at the time of transition from one stage to another for each differential pressure threshold, at the level of each altitude threshold.

Figure 6:
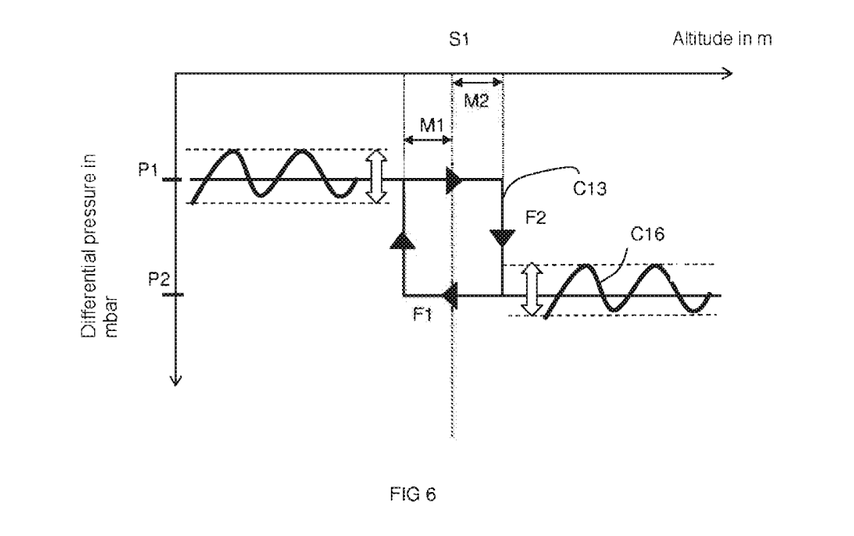
FIG. 6 illustrates in detail the phenomenon of hysteresis applied to curve C13 of FIG. 5 close to the altitude threshold Si visible on FIG. 5.

FIG. 6 illustrates in detail the phenomenon of hysteresis applied to curve C13 of FIG. 5, close to the first altitude threshold S1. Thus for the curve C13 associated with the first differential pressure threshold, a hysteresis phenomenon is applied at the level of the first altitude threshold S1 such that:

the transition (following arrows F1) from stage P2 to the directly lower stage P1 as the altitude decreases is applied at the moment when the vehicle's altitude is lower than said altitude threshold S1 and when the difference between said altitude threshold S1 and the vehicle's altitude becomes greater than a first predefined value M1, the transition (following arrows F2) from stage P1 to the directly higher stage P2 as the altitude increases is applied at the moment when the vehicle's altitude is higher than said altitude threshold S1 and when the difference between the vehicle's altitude and said altitude threshold S1 becomes greater than a second predefined value M2.

The second predefined value M2 may in some cases be equal to the first predefined value M1, but M1 and M2 may also have different values, for example as a function of the value of the corresponding altitude threshold and/or as a function of the curve C13 to C15 considered.

While curve C13 represents the variation in the first differential pressure threshold as a function of the vehicle's altitude, defined as the differential pressure threshold commanding the stoppage of operation of the vacuum pump, curve C16 of FIG. 6 shows the development, as a function of the vehicle's altitude, in the actual vacuum differential level measured by a sensor of the braking system to which the vacuum pump is connected.

FIG. 6 thus shows the particular case of curve C13 at the level of the first altitude threshold S1 for the transition from stage P1 to stage P2 and vice versa. However, for this curve C13, the hysteresis phenomenon is identical to the second altitude threshold S2 for transition from stage P2 to stage P3 or vice versa. Similarly, the hysteresis phenomenon is identical for curve C14 for transition from stage P4 to stage P5 or vice versa, at the level of the first altitude threshold S1. Furthermore, the hysteresis principle is identical for this curve C14 for transition from stage P5 to P6 or vice versa, at the level of the second altitude threshold S2. Similarly, the hysteresis principle is identical for curve C15 for transition from stage P7 to stage P8 or vice versa, at the level of the first altitude threshold S1. Furthermore, the hysteresis phenomenon is identical for this curve C15 for transition from stage P9 to P8 or vice versa, at the level of the second altitude threshold S2.

It is clear from the above that the vehicle's altitude may be taken into account in determination and adaptation of the differential pressure thresholds, in particular the detection thresholds for starting and/or stoppage of the vacuum pump, or the threshold for triggering alerts. The electronic control unit acquires the data relating to altitude or determines these itself; it performs the comparison at each moment for a predefined period between the actual altitude and the altitude thresholds previously stored therein. Similarly, the electronic control unit contains curves C7 to C15 in its memory.

Although these considerations may be implemented separately, it is possible to combine the consideration of detection or non-detection of a repetitive braking situation and the consideration of the vehicle's altitude when determining the differential pressure thresholds linked to the vacuum pump.

It is clear from the above that the highly advantageous solution applied in this document may also be formulated as follows.

This is a method for managing a vacuum pump connected to a braking system of a motor vehicle, comprising a step of using an electronic control unit linked to the vacuum pump to implement a step of determining at least one differential pressure threshold associated with the vacuum pump and selected from a first differential pressure threshold commanding the stoppage of operation of the vacuum pump, a second differential pressure threshold commanding the start of the vacuum pump, and a third differential pressure threshold lower than the second threshold and signaling alerts representative of operating defects, this method being remarkable in that it comprises a step of modifying at least the first and second differential pressure thresholds, perhaps also the third differential pressure threshold, as a function of the travel speed of the vehicle, and in that said step of modification is inhibited or modulated as a function of at least one data set representative of a characteristic different from the vehicle's speed, in particular the detection or non-detection of a repetitive braking situation and/or the vehicle's altitude.

One advantage is that when the altitude remains moderate, the management strategy developed in this document allows operation of the vacuum pump only when necessary.

Another advantage is that starting of the vacuum pump only when necessary allows the power plant to revise its strategies of triggering consumers. This logic is present in the electronic control unit which controls the vacuum pump and it uses the information linked to altitude.

The strategy implemented depends on the reliability of the altitude information. In the case of erroneous or missing information, the differential pressure threshold adopted ensures the safety of the vehicle irrespective of altitude, which may limit the savings in consumption on start up of the vacuum pump. The vacuum level will always be optimum during repetitive brakings which consume the vacuum.

The invention claimed is:

1. A method for managing a vacuum pump connected to a braking system of a motor vehicle and comprising:
   using an electronic control unit linked to the vacuum pump, the vacuum pump being an electric vacuum pump;
   determining at least one differential pressure threshold associated with the vacuum pump and selected from a first differential pressure threshold commanding stoppage of operation of the vacuum pump, a second differential threshold commanding starting of the vacuum pump, and a third differential pressure threshold lower than the second threshold and signaling alerts representative of operating defects, while taking into account at least one of a first data set representative of detection or non-detection of a repetitive braking situation, and a second data set representative of altitude of the vehicle; and
   modifying at least one of the first differential pressure threshold, the second differential threshold, and the third differential pressure threshold when the repetitive braking situation is detected such that the vacuum pump is controlled according to the first differential pressure threshold, the second differential threshold, and the third differential pressure threshold.

2. The management method as claimed in claim 1, further comprising modifying at least the first and second differential pressure thresholds such that at a given altitude, at least the first and second differential pressure thresholds develop by incremental stages when the vehicle's travel speed increases, a transition between two successive stages occurring at predefined speed thresholds stored in an electronic control unit.

3. The management method as claimed in claim 2, wherein the modifying is inhibited when the first data set is representative of detection of presence of a repetitive braking situation, such that at least the first and second differential pressure thresholds are held constant by the electronic control unit irrespective of the vehicle's travel speed.

4. The management method as claimed in claim 2, wherein the modifying is modulated as a function of the second data.

5. The management method as claimed in claim 2, wherein the modifying includes modifying the third differential pressure threshold such that at the given altitude the third differential pressure threshold also develops by incremental stages when the vehicle's travel speed increases, a transition between two successive stages occurring at predefined speed thresholds stored in an electronic control unit.

6. The management method as claimed in claim 5, wherein the modifying is inhibited when the first data set is representative of detection of presence of a repetitive braking situation, such that the first, second, and third differential pressure thresholds are held constant by the electronic control unit irrespective of the vehicle's travel speed.

7. The management method as claimed in claim 1, wherein at a given travel speed of the vehicle, at least the first and second differential pressure thresholds develop incrementally as a function of the altitude of the vehicle.

8. The management method as claimed in claim 7, wherein at the given travel speed of the vehicle the third differential pressure threshold also develops incrementally as a function of the altitude of the vehicle.

9. The management method as claimed in claim 1, wherein at a given travel speed of the vehicle, at least the first and second differential pressure thresholds develop by incremental stages as the vehicle's altitude increases, the transition between two successive stages occurring at predefined altitude thresholds stored in the electronic control unit.

10. The management method as claimed in claim 9, wherein at the given travel speed of the vehicle the third differential pressure threshold also develops by incremental stages as the vehicle's altitude increases, the transition between two successive stages occurring at predefined altitude thresholds stored in the electronic control unit.

11. The management method as claimed in claim 9, wherein at each altitude threshold, a hysteresis is implemented such that:
a transition from one stage to an immediately lower stage as the altitude decreases is applied at a moment when the vehicle's altitude is lower than the altitude threshold and when the difference between the altitude threshold and the vehicle's altitude becomes greater than a first predefined value;
a transition from one stage to an immediately higher stage as the altitude increases is applied at a moment when the vehicle's altitude is higher than the altitude threshold and when the difference between the vehicle's altitude and the altitude threshold becomes greater than a second predefined value, which may be equal to the first predefined value.

12. A system for managing a vacuum pump connected to a braking system of a vehicle, comprising an electronic control unit including hardware and/or software elements implementing the management method as claimed in claim 1.

13. The system as claimed in claim 12, comprising an element for detecting presence or absence of a repetitive braking situation and supplying the electronic control unit with the first data set, and/or an element for assessing the altitude of the vehicle and supplying the electronic control unit with the second data set.

14. A motor vehicle comprising:
a system as claimed in claim 13;
a vacuum pump associated with a vacuum reserve and managed by the system;
the electronic control unit being linked to the vacuum pump to start an operation of the vacuum pump when the difference between ambient pressure of the vehicle and pressure of the vacuum reserve is less than or equal to the second differential pressure threshold determined by the electronic control unit, and to stop the operation of the vacuum pump when the difference between the ambient pressure of the vehicle and the pressure of the vacuum reserve is greater than or equal to the first differential pressure threshold determined by the electronic control unit.

15. A method for managing a vacuum pump connected to a braking system of a motor vehicle and comprising:
using an electronic control unit linked to the vacuum pump, the vacuum pump being an electric vacuum pump;
determining at least one differential pressure threshold associated with the vacuum pump and selected from a first differential pressure threshold commanding stoppage of operation of the vacuum pump, a second differential threshold commanding starting of the vacuum pump, and a third differential pressure threshold lower than the second threshold and signaling alerts representative of operating defects, while taking into account at least one of a first data set representative of detection or non-detection of a repetitive braking situation, and a second data set representative of altitude of the vehicle;
modifying at least the first and second differential pressure thresholds, and possibly also the third differential pressure threshold, such that at a given altitude, at least the first and second differential pressure thresholds and possibly also the third differential pressure threshold develop by incremental stages when the vehicle's travel speed increases, a transition between two successive stages occurring at predefined speed thresholds stored in an electronic control unit,
wherein the modifying is inhibited when the first data set is representative of detection of presence of a repetitive braking situation, such that at least the first and second differential pressure thresholds, and possibly also the third differential pressure threshold, are held constant by the electronic control unit irrespective of the vehicle's travel speed.

* * * * *